(12) United States Patent
Chow et al.

(10) Patent No.: US 7,216,154 B1
(45) Date of Patent: May 8, 2007

(54) APPARATUS AND METHOD FOR FACILITATING ACCESS TO NETWORK RESOURCES

(75) Inventors: Kingsum Chow, Hillsboro, OR (US); Colin Cunningham, Portland, OR (US); Thomas Holman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 09/724,336

(22) Filed: Nov. 28, 2000

(51) Int. Cl.
*G06F 15/16* (2006.01)
(52) U.S. Cl. .................................................. 709/219
(58) Field of Classification Search ................ 709/226, 709/217–219, 203, 238, 241, 243; 718/105
See application file for complete search history.

(56) References Cited

U.S. PATENT DOCUMENTS

| | | | | | |
|---|---|---|---|---|---|
| 5,774,660 | A | * | 6/1998 | Brendel et al. | 709/201 |
| 5,933,596 | A | * | 8/1999 | Mayhew | 709/203 |
| 5,933,606 | A | * | 8/1999 | Mayhew | 709/239 |
| 6,052,718 | A | * | 4/2000 | Gifford | 709/219 |
| 6,092,178 | A | * | 7/2000 | Jindal et al. | 712/27 |
| 6,115,752 | A | * | 9/2000 | Chauhan | 709/241 |
| 6,128,279 | A | * | 10/2000 | O'Neil et al. | 370/229 |
| 6,223,209 | B1 | * | 4/2001 | Watson | 709/201 |
| 6,279,001 | B1 | * | 8/2001 | DeBettencourt et al. | 707/10 |
| 6,304,913 | B1 | * | 10/2001 | Rune | 709/241 |
| 6,317,775 | B1 | * | 11/2001 | Coile et al. | 709/201 |
| 6,324,580 | B1 | * | 11/2001 | Jindal et al. | 709/228 |
| 6,327,622 | B1 | * | 12/2001 | Jindal et al. | 709/228 |
| 6,339,785 | B1 | * | 1/2002 | Feigenbaum | 709/213 |
| 6,360,270 | B1 | * | 3/2002 | Cherkasova et al. | 709/229 |
| 6,389,448 | B1 | * | 5/2002 | Primak et al. | 718/105 |
| 6,405,252 | B1 | * | 6/2002 | Gupta et al. | 709/224 |
| 6,415,280 | B1 | * | 7/2002 | Farber et al. | 707/2 |
| 6,463,454 | B1 | * | 10/2002 | Lumelsky et al. | 718/105 |
| 6,490,615 | B1 | * | 12/2002 | Dias et al. | 709/219 |
| 6,578,066 | B1 | * | 6/2003 | Logan et al. | 718/105 |
| 6,606,643 | B1 | * | 8/2003 | Emens et al. | 709/203 |
| 6,658,473 | B1 | * | 12/2003 | Block et al. | 709/226 |
| 6,671,259 | B1 | * | 12/2003 | He et al. | 370/238 |

(Continued)

OTHER PUBLICATIONS

Hiraiwa et al., "Dynamic Load Balancing for Distributed Movie Baed Browser Systems," Jun. 1998, Proceedings of the 1998 IEEE International Symposium on Circuits and Systems, vol. 4, pp. 97-101.*

(Continued)

*Primary Examiner*—Rupal Dharia
*Assistant Examiner*—Sean Reilly
(74) *Attorney, Agent, or Firm*—Molly A. McCall

(57) ABSTRACT

For a client seeking network resources from a network site, such as a web page, audio, visual, or other data, where the network site's desired network resources are also provided by mirroring network hosts, measurements are made to determine a communication efficiency between the client and the network site and mirroring network hosts. The client is then directed to communicate with the network site or a mirroring network host according to which had the highest measured communication efficiency with the client. In such fashion, real time adjustments can be made so as to more optimally distribute client network resource requests across all available sources of the desired network resources, and provide for real time load balancing and fail over of disabled hosts.

31 Claims, 8 Drawing Sheets

U.S. PATENT DOCUMENTS

| | | | |
|---|---|---|---|
| 6,684,252 B1* | 1/2004 | Chow | 709/228 |
| 6,766,373 B1* | 7/2004 | Beadle et al. | 709/227 |
| 6,829,642 B1* | 12/2004 | Giroir et al. | 709/225 |
| 6,922,724 B1* | 7/2005 | Freeman et al. | 709/223 |
| 2001/0049741 A1* | 12/2001 | Skene et al. | 709/232 |

OTHER PUBLICATIONS

Cardellini et al., "Redirection Algorithms for Load Sharing in Distributed Web-server Systems," Jun. 1999, Proceedings from th 1999 IEEE International Conference on Distributed Computing Systems, pp. 528-535.*

Cardellini et al., "Dynamic Load Balancing on Web-Server Systems," Jun. 1999, IEEE Internet Computing, pp. 28-39.*

\* cited by examiner

APPARATUS AND METHOD FOR FACILITATING ACCESS TO NETWORK RESOURCES

FIELD OF THE INVENTION

The invention generally relates to providing network resources to clients, and more particularly to providing mirrored network resources with multiple network hosts, where a requesting client is automatically directed to a network host having a more efficient communication channel with the client.

BACKGROUND

With the widespread availability of intranets and the Internet in the home and workplace, network traffic has become increasingly congested, leading to increasing in client delays in obtaining desired network resources.

In an effort to avoid such delays, a common technique is to host a network site, e.g., a web site or other network resource, on multiple network hosts in different geographic areas. Thus, a network site may be hosted in different countries and localities within the countries. An incoming client networking connection is then manually or automatically redirected to a host geographically closest to the client.

In a manual environment, on contacting one host, the host returns to the client a network resource, such as a web page, providing alternative hosts for the client. For example, assuming a client receives a web page, the page may contain hyperlinks to the available network hosts for the contacted site.

In an automatic redirection environment, when the network site's network name, e.g., a Uniform Resource Locator (URL), is resolved by a Domain Name Server (DNS), rather than having the DNS return an established (or static) mapping of a network address for the network site's name, instead the DNS returns the network address of whichever network host is geographically closest to the client. It is assumed that host addressing conforms to naming devices on a network, with DNS supplying an address, such as a Transmission Control Protocol/Internet Protocol (TCP/IP) address, for the named device. The theory is that geographically distant network hosts will have longer network delays, while close network hosts will have short delays. Unfortunately, such an arrangement does not always result in the client being connected to the network host having the most efficient connection to the client, e.g., the network host providing the fastest data response times to the client.

BRIEF DESCRIPTION OF THE DRAWINGS

The features and advantages of the present invention will become apparent from the following detailed description of the present invention in which.

DETAILED DESCRIPTION

Figure 1:
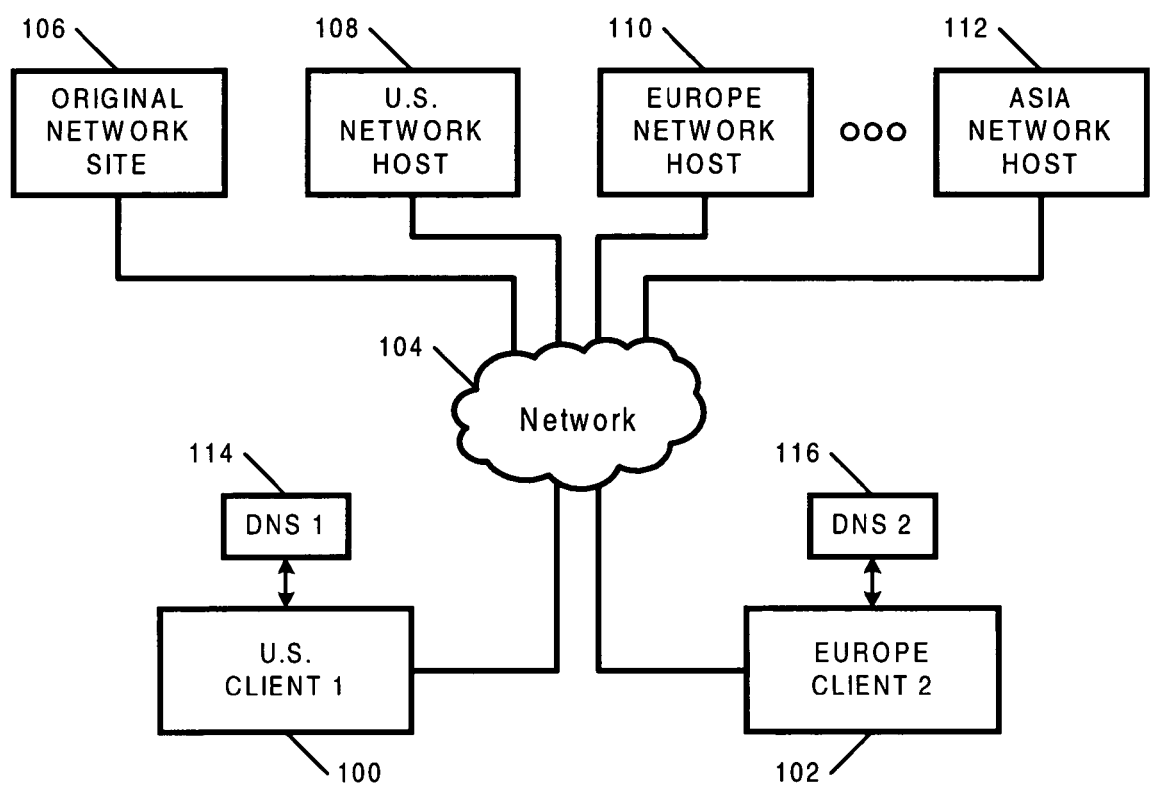
FIG. 1 illustrates a generalized network environment in accordance with one embodiment of the invention.

FIG. 1 illustrates a generalized network environment in accordance with one embodiment of the invention.

As illustrated, a United States based Client 1 100 and a Europe based Client 2 102 are in communication with a network 104, such as an intranet, the Internet, or other networking environment (e.g., wireless, satellite, etc.). Although a single network is illustrated, it will be appreciated that there may be many individual networks, wired and wireless, that are interconnected to form the illustrated network. Clients 100, 102 seek network resources, such as web pages or other data, from a network site 106. To facilitate access to the network site's data, some or all of the site's network resources are "mirrored" or otherwise made available through other network hosts 108, 110, 112.

As illustrated, the other mirroring network hosts may include, for example, a United States based Network Host 108, a Europe based Network Host 110, and an Asia based Network Host 112. As indicated by the ellipses, there may be many more hosts in other localities, each mirroring some or all of Original Network Site resources. As used herein and the claims that follow, unless indicated otherwise either explicitly or implicitly through context, the phrase "network host" may collectively reference the Original Network Site 106 as well as the mirroring network hosts 108, 110, 112.

When Client 1 100 seeks to access the network site 106, it is assumed that Client 1 provides the name of the Original Network Site to a name resolution service, such as Domain Name Server (DNS) 1 114. In response, DNS 1 returns a network address for the Original Network Site 106, or that of the mirroring network hosts 108, 110, 112, depending on the resolution strategy in use.

Assuming a prior art geographic-base resolution strategy, if the United States based Network Host 108 is geographically closest to Client 1 100, then when Client 1 100 attempts to resolve the Original Network Site's 106 network name, DNS 1 114 will direct Client 1 to the United States Network Host. Client 1 then communicates directly with the United States Network Host to obtain network resources. Similarly, if Client 2 102 tries contacting the Original Network Site, since Client 2 is in France, with geographic-based resolution, DNS 2 116 returns the network address for the Europe based Network Host 110.

One problem with the geographic based approach, however, is that it assumes geographic proximity equates with communication efficiency. Unfortunately this may not be the case. For example, local and regional network congestion, problems in network hardware, incorrectly configured equipment, etc., can result in a nearest of the network hosts being a less efficient data source than one of the other network hosts. Or, a particular remote network host might be reachable over a higher-speed data pathway, such as an Internet "backbone" (e.g., a fast Synchronous Optical Network (SONET) Optical Carrier (OC)). Thus, the result provided by a geographical-based resolution DNS may be sub-optimal.

Figure 2:
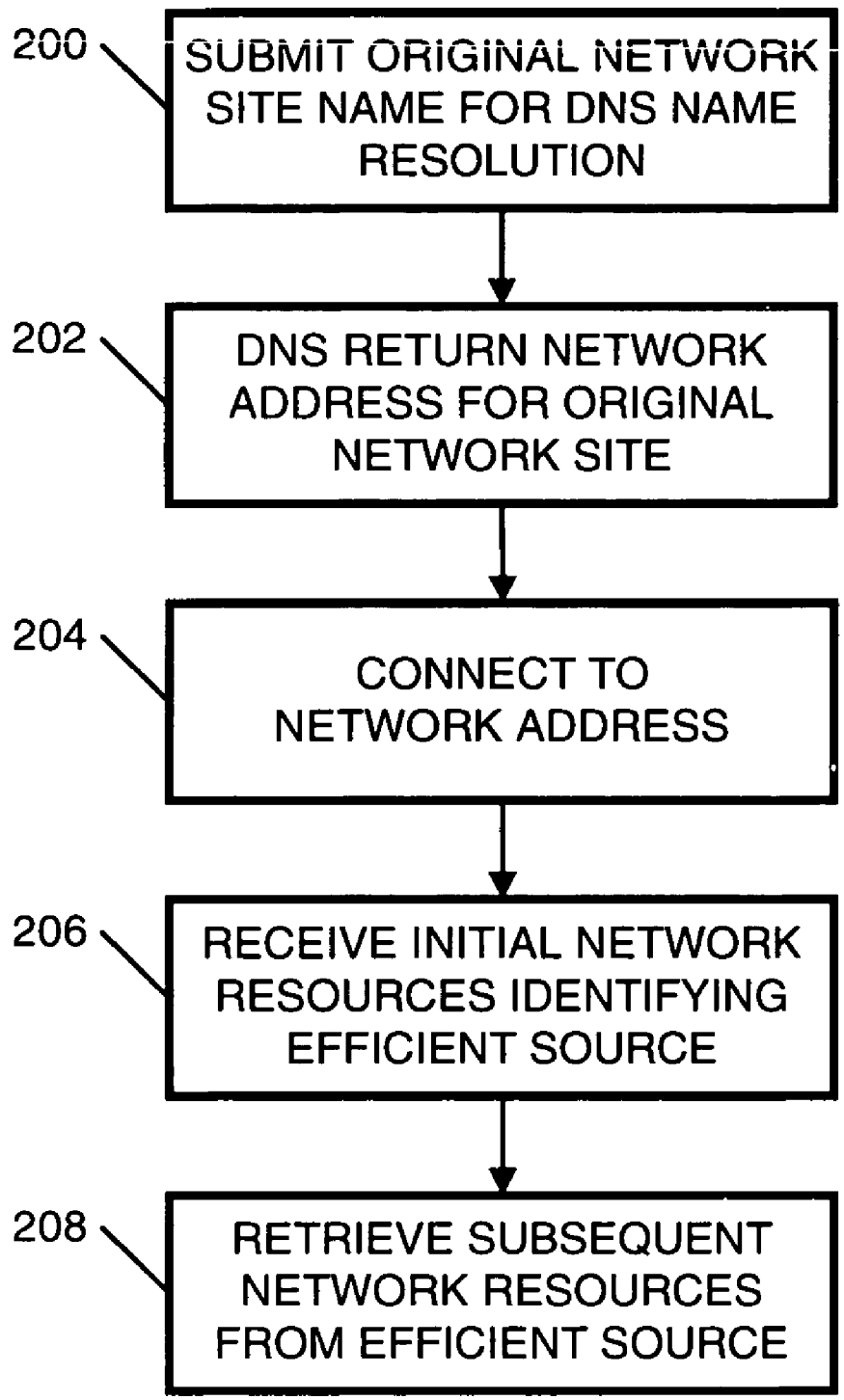
FIG. 2 is a flowchart illustrating one embodiment for a client to obtain a network site's resources by determining and directing the client connection to an efficient source for the desired network resources.

FIG. 2 is a flowchart illustrating one embodiment for Client 1 100 (FIG. 1) to select between available network hosts 106–112 for obtaining the Original Network Site's 106 network resources according to the present invention. In one embodiment, in order to ensure that Client 1 is connected to a network host providing a more efficient communication session, response times for receiving network data from the various network hosts are measured, and the host having fastest response time is utilized.

A first operation is for Client 1 100 to submit 200 the Original Network Site's name to its resolution service, e.g., DNS 1 114. DNS 1 then returns 202 a network address corresponding to the Original Network Site. In one embodiment, DNS 1 returns an address for a geographically closest network host as in the prior art. In an alternate embodiment, DNS 1 simply returns the network address for the Original Network Site. Once Client 1 has a resolved network address, it then connects 204 to the provided network address. In response, Client 1 then receives 206 initial network resources from the network host.

In one embodiment, before returning the network resource to Client 1 100, the contacted network host determines the most efficient communication pathway to Client 1, e.g., it determines the network host with which Client 1 ought to be communicating. Towards this end, the Original Network Site 106 and mirroring network hosts 108, 110, 112 are inspected (FIG. 5) to determine an efficiency rating tracked by each host regarding communication with Client 1. The network host (or hosts) identified as being most efficient is then encoded within the network resource returned to Client 1.

Based on this encoding, Client 1 then continues its retrieval 208 of network resources according to the embedded reference. It will be appreciated that the resource can be of any data type, including web page code, audio data, video data, a database, operational commands/directives for controlling Client 1, another data type allowing for embedded links/references to other resource locations, or some combination of these data types. Thus, for example, a network resource retrieved from a first host may be a Joint Photographic Experts Group (JPEG) graphics file containing embedded tags linking to a more efficient second host for processing the image.

Figure 3:
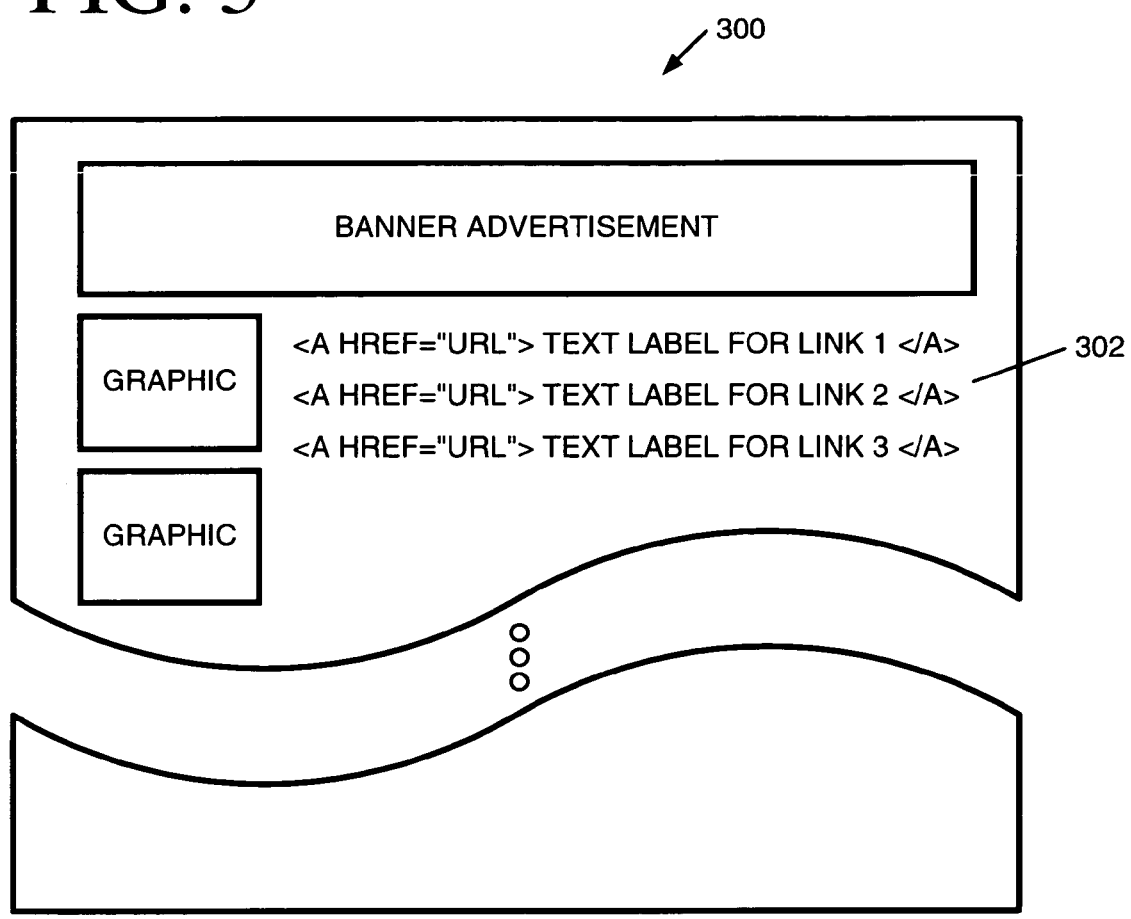
FIG. 3 illustrates one embodiment for redirecting the client to the more efficient communication source.

FIG. 3 illustrates one embodiment in which the returned network resource is a web page 300, and the encoded reference is an embedded link 302 to a resource located on the network host 106–112 that was identified as being most efficient.

In this embodiment, Client 1 100 contacts the network site indicated by DNS 1 114 and receives a web page in which its web page links, rather than referencing the originator of the web page, instead directs Client 1 towards the network host identified as being most efficient.

In another embodiment (not illustrated), the returned network resource is a redirection request to redirect Client 1 100 to communicate directly with the efficient communication source. Common examples of redirection commands include HyperText Markup Language (HTML) redirection commands, Java/JavaScript code to redirect a browser, and Common Gateway Interface (CGI)/Perl scripts to redirect Client 1. In this embodiment, rather than Client 1 receiving a substantive network resource from the contacted network host, such as an entire web page, instead Client 1 100 receives minimal data required to effect a redirection of its communication.

Figure 4:
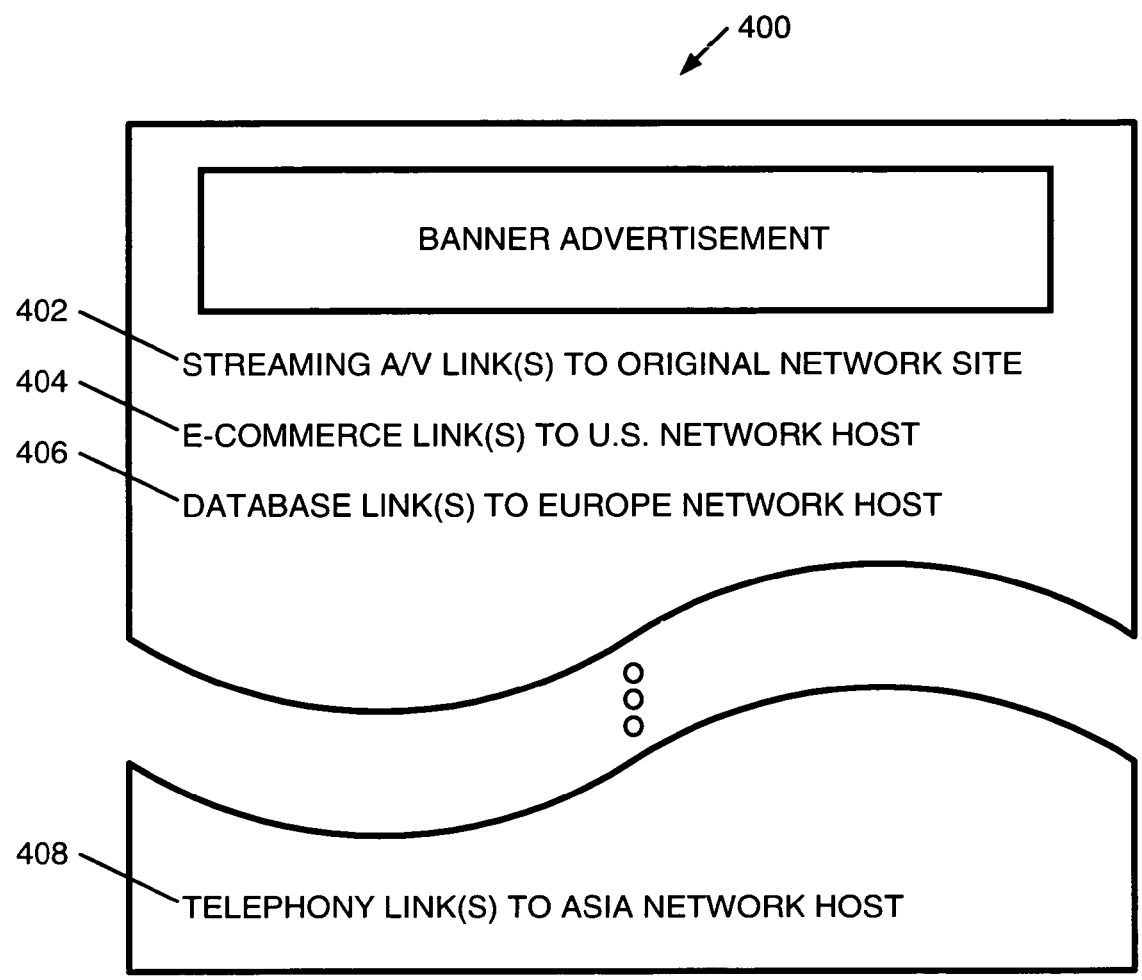
FIG. 4 illustrates another embodiment for redirecting the client to multiple more efficient communication sources.

FIG. 4 illustrates another embodiment, in which the returned network resource 400 from the network host identified by a DNS includes multiple encoded references to multiple network hosts, with each encoded reference providing a link to the most efficient communication source for the type of resource being linked.

For example, if the returned resource is a web-page, and the web page is to include links 402 to streaming audio and/or visual data, links 404 to electronic commerce (e-commerce), links 406 to database resources, links 408 to telephony operations, etc., then these embedded web page links 402–408 can direct Client 1 to the network hosts 106–112 having highest efficiency for that resource.

In the case of streaming media or other such data types, the link may automatically initialize/start delivery of the streaming media. Thus, with respect to Client 1 100, U.S. Network Host 108 (FIG. 1) may be, for example, the most efficient source for audio data (links 402), while the Original Network Site 106 may be the most efficient source for engaging in e-commerce transactions (links 404).

Figure 5:
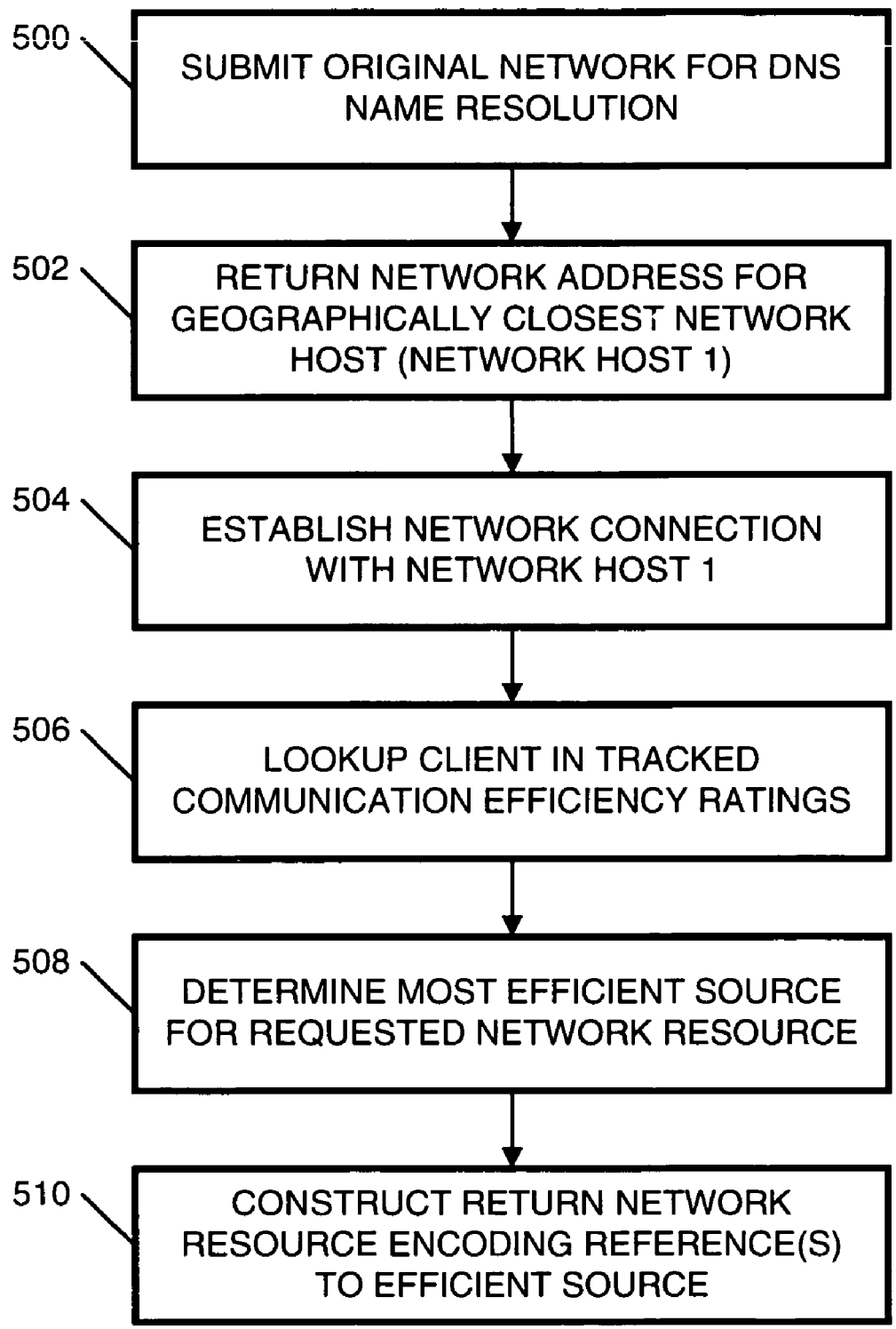
FIG. 5 is a flowchart illustrating one embodiment for determining an efficient communication source to which to direct the client.

FIG. 5 is a flowchart illustrating one embodiment for determining which of the Original Network Site 106 and mirroring Network Hosts 108, 110, 112 is the most efficient source for retrieving desired network resources. In one embodiment, each possible network host (e.g., hosts 106–112) for handling a client's (e.g., Client 1 100) request for network resources maintains a table (see FIG. 6), database, or other data structure tracking known efficiency ratings for communication with the client.

Assume Client 1 100 attempts to locate 500 the Original Network Site 106 to retrieve certain network resources, such as a web page. As discussed above, assuming geographic resolution, Client 1's DNS returns 502 the network address of the United States Network Host 108 due to it being geographically closest to Client 1.

Client 1 then establishes 504 a network connection with the United States Network Host 108. In response to this contact, the United States Network Host looks up network host 106, 110, 112 is a more efficient source for Client 1's resource request. Assuming the Europe Network Host 110 is most efficient, then the U.S. Network Host constructs 510 a return network resource, in this case a web page, containing encoded references to the Europe Network Host.

Figure 6:
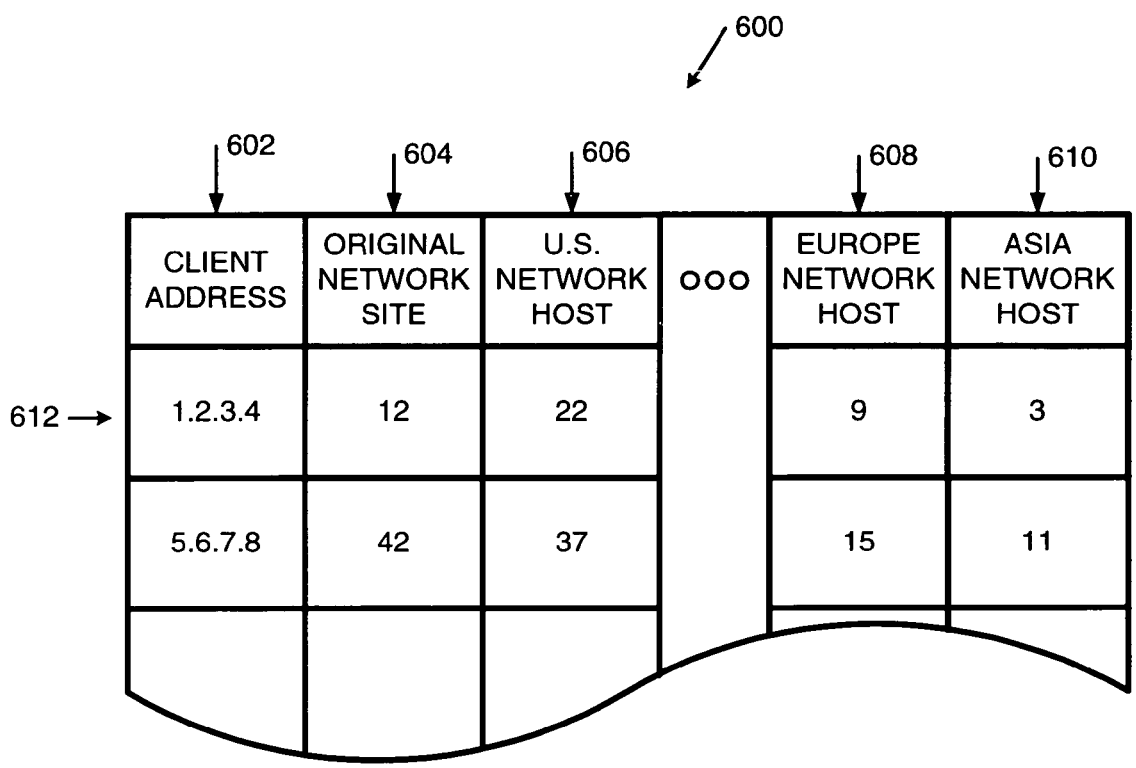
FIG. 6 illustrates an exemplary table for tracking clients and their communication efficiencies for different network hosts.

FIG. 6 illustrates an exemplary table 600 for tracking clients and their communication efficiencies for different network hosts. It is assumed that a copy of this table is available to all network hosts, or that the table is shared among all hosts.

In the illustrated embodiment, tracked communication efficiency data is indexed according to a client's network address, e.g., it's Internet Protocol (IP) address if a TCP/IP network is used. As illustrated, addresses are stored in the first column 602 of the table. The remaining columns 604–610 store tracked efficiency values indicating efficiency of communication between a particular client and the network hosts.

Thus, for the client having network address 1.2.3.4 (assuming TCP/IP dot quad addressing) in the first row 612 of the table, the stored data indicates the client has measured efficiency values of 12, 22, 9, and 3 respectively for the Original Network Site, and its mirroring sites. (Note that the values have been arbitrarily selected and are not intended to reflect a particular evaluation method or scale.) Consequently, if the client at address 1.2.3.4 initially contacted the Original Network Site, as discussed above, the Original Network Site would look up the client's row 612 in the table, determine the U.S. Network Host mirror is a more efficient source for the client, and direct subsequent communication from the client to be sent to the more efficient source.

In another embodiment, rather than indexing just by the client's network address, the tracking data is also indexed according to the client's TCP/IP response port (e.g., per ports assigned by Port Address Translation (PAT)) designated for sending data to the client. This embodiment allows multiple clients to use Network Address Translation (NAT) (see Network Working Group's Request For Comments (RFC) 1631), PAT, or related techniques for managing and sharing IP addresses.

In one embodiment, each table entry of columns 602–610 include sub-categories (not shown) of data to allow further efficiency specificity with respect to a particular client. For example, each table entry can be sub-divided by time of day to allow host contact optimizations based on actual network usage. Thus, if a client is coming from a location having high network congestion during the hours of 5 PM through 8 PM, a table entry can appropriately direct the client to a more efficient host for that timeframe. It will be appreciated that any characteristic of interest may be used for sub-categories.

In one embodiment, each table entry in columns 602–610 includes sub-entries storing reliability ratings (not shown) that can be used to weight or rank stored efficiency ratings. Thus, a client may be directed to a host having a lesser efficiency, but higher reliability, than another host. It will be appreciated that the illustrated table 600 comprises an efficient and compact data structure, since it provides a 1:1 mapping between table columns and the number of network hosts 106–112 (FIG. 1) (e.g., data centers), and the number of rows may be limited (if desired) according to thresholds or caching techniques.

Figure 7:
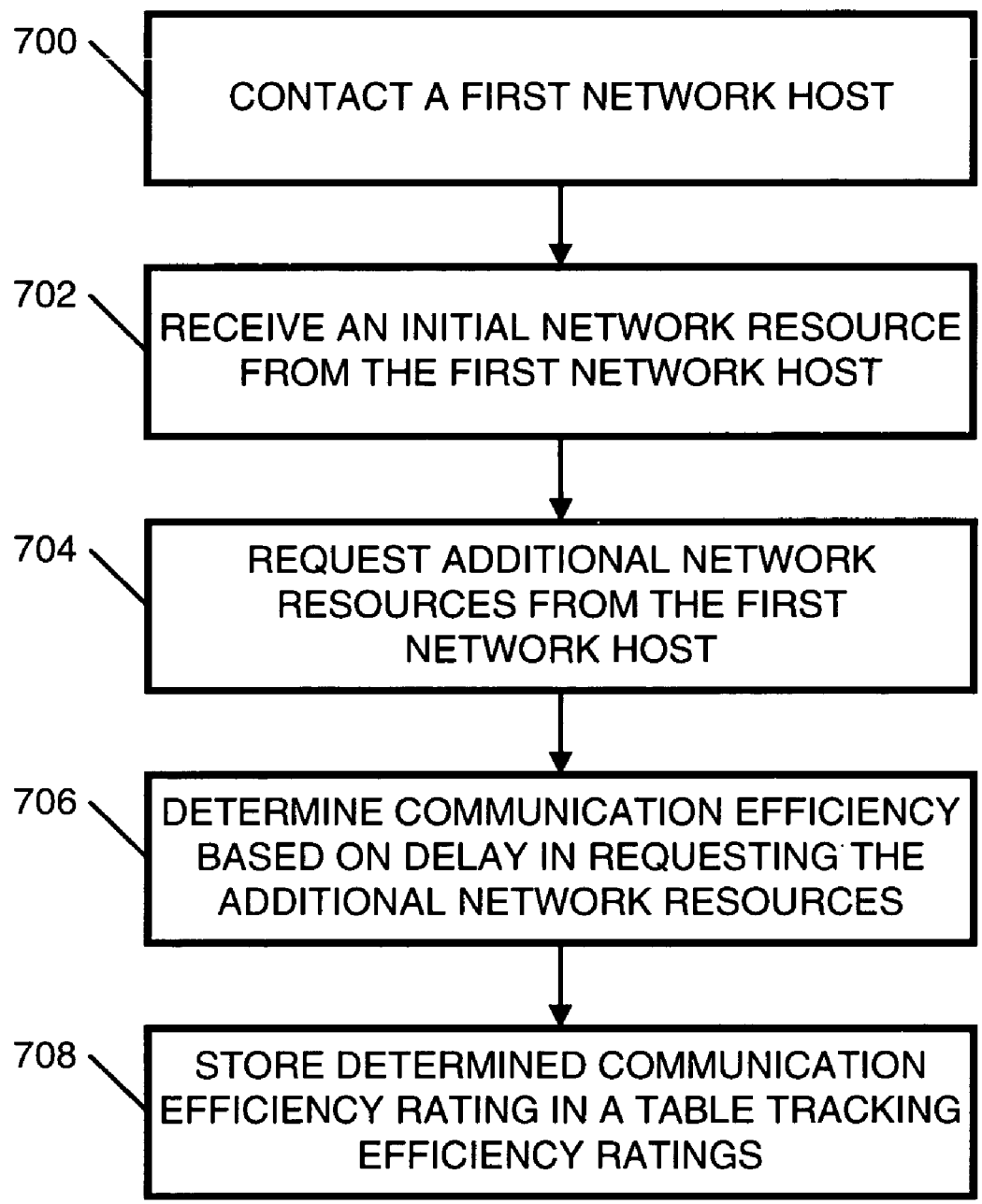
FIG. 7 illustrates a generalized approach to determining efficiency ratings.

FIG. 7 illustrates a generalized approach to determining efficiency ratings. Generally, the efficiency ratings stored in the FIG. 6 table can be an average, moving average, or other statistic or heuristic measurement of actual communication performance with the client, and therefore account for real-time disturbances in communication data paths between the client and network hosts.

In one embodiment, the communication efficiency ratings stored in the tracking data correspond to measured communication delays between the client and a network host 106–112 maintaining the tracking data. In one embodiment, efficiency ratings factor in past and/or predicted reliability of a host.

As illustrated, a client contacts 700 a first network host. In response the client receives 702 a network resource from the first network host, where the received network resource contains embedded references which cause the client to request 704 additional resources from the first network host so as to allow the first network host to determine 706 communication efficiency with the contacting client. In one embodiment, the network resource also directs the client to request additional resources from other network hosts so that they can also determine communication efficiency.

For example, assuming the resource initially received from the first network host is a web page, the web page has embedded links to additional resources, such as to graphics images. Knowing the sizes of the additional resources, the first network host can measure the time delay between the requests for the additional resources to predict the communication efficiency between the client and the first network host. The predicted value is then stored 708 in a FIG. 6 table.

As noted above, the web page may be configured to cause the client to perform similar resource requests from other network hosts so they can also determine communication efficiency values.

In one embodiment, the tracked efficiency rating incorporate status information provided by network and server monitoring systems/services, so that systems determined to have problems will be updated as having very inefficient values (or a special value, such as a negative number, indicating complete unavailability). Thus, if a particular server is down, this failure impacts its communication efficiency with the client, which in turn causes a different network host to be determined as being the most efficient source for the client's desired resources.

In addition, determining an efficient host based on real time interactions between a client and each network host providing desired network resources allows one to also perform load balancing of client contact requests. A host having a high load will automatically produce a less efficient response time, causing the client's communication efforts to be directed elsewhere.

Tracked efficiency ratings may be revised on a periodic basis. In one embodiment, the tracked efficiency ratings are revised as a function of the number of data transactions occurring with Client 1. For example, assuming Client 1's desired network resource is web page data, then a small percentage of the web transactions, e.g., 0.01%, can be configured to cause new efficiency ratings to be measured. Measured and revised efficiency ratings are propagated to all network hosts 106–112.

Figure 8:
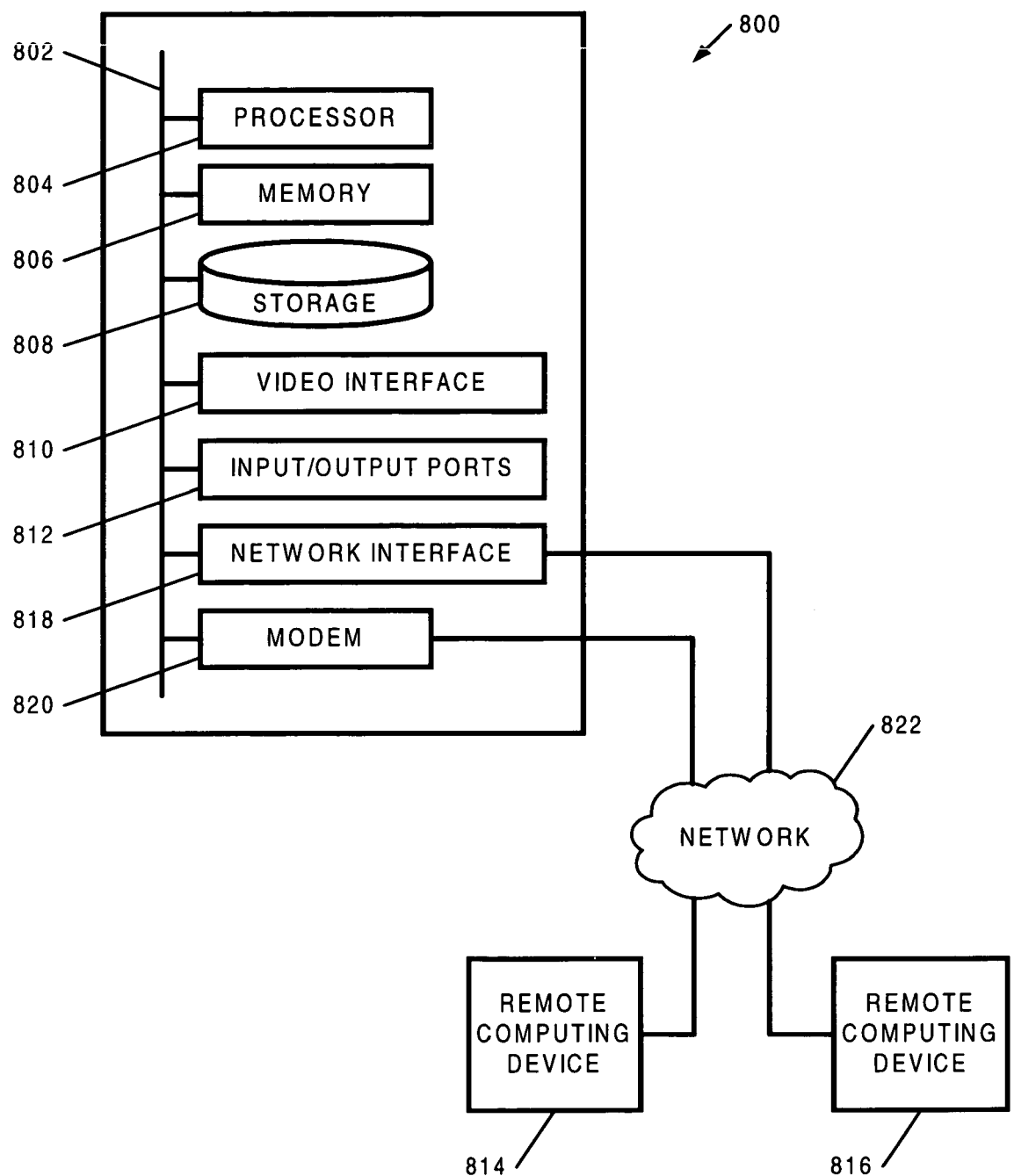
FIG. 8 illustrates a suitable computing environment in which certain aspects of the invention may be implemented.

FIG. 8 and the following discussion are intended to provide a brief, general description of a suitable computing environment in which certain aspects of the illustrated invention may be implemented.

An exemplary system for implementing the invention includes a computing device 800 having system bus 802 for coupling various computing device components. Typically, attached to the bus are non-programmable and programmable processors 804, a memory 806 (e.g., RAM, ROM), storage devices 808, a video interface 810, and input/output interface ports 812. Storage devices include hard-drives, floppy-disks, optical storage, magnetic cassettes, tapes, flash memory cards, memory sticks, digital video disks, and the like.

The invention may be described by reference to different high-level program modules and/or low-level hardware contexts. Those skilled in the art will realize that program modules can be interchanged with low-level hardware instructions. Program modules include procedures, functions, programs, components, data structures, and the like, for performing particular tasks or implementing particular abstract data types. Modules may be incorporated into single and multi-processor computing devices, Personal Digital Assistants (PDAs), cellular telephones, and the like. Thus, the storage systems and associated media can store data and executable instructions for the computing device.

The computing device is expected to operate in a networked environment using logical connections to one or more remote computing devices 814, 816 through a network interface 818, modem 820, or other communication pathway. Computing devices may be interconnected by way of a network 822 such as an intranet, the Internet, or other network. Modules may be implemented within a single computing device, or processed in a distributed network environment, and stored in both local and remote memory. Thus, for example, with respect to the illustrated embodiments, assuming computing device 800 is Client 1 100 (FIG.

1) seeking to obtain a network resource from an Original Network Site 106, then remote devices 814, 816 may respectively be the Original Network Site and the United States Network Host 108 mirroring some or all of the Original Network Site's network resources.

It will be appreciated that remote computing devices 814, 816 may be configured like computing device 800, and therefore include many or all of the elements discussed for computing device. It should also be appreciated that computing devices 800, 814, 816 may be embodied within a single device, or separate communicatively-coupled components, and may include or be embodied within routers, bridges, peer devices, web servers, and application programs utilizing network application protocols such as the HyperText Transfer Protocol (HTTP), File Transfer Protocol (FTP), and the like.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for locating an efficient server among servers mirroring a network site, comprising:
   receiving a request for a resource from a client in communication with said servers over a network, the resource including links to a first resource of a first type and a second resource of a second type different from the first type;
   determining for a first server an efficiency rating indicating the first server is efficient at providing resources of at least the first type to the client;
   determining for a second server an efficiency rating indicating the second server is efficient at providing resources of at least the second type to the client; and
   directing the client to subsequently communicate with the first server for accessing the first resource and the second server for accessing the second resource.

2. The method of claim 1, wherein said determining the first efficiency rating comprises a selected one of:
   measuring communication efficiency between the first server and the client, and
   looking-up a previously measured communication efficiency between the first server and the client.

3. The method of claim 1, further comprising:
   wherein said directing comprises returning a network resource to the client containing a first link to the first resource at the first server and a second link to the second resource at the second server.

4. The method of claim 3, wherein the network resource comprises a web page element containing at least the first and second links respectively linking to the first and second servers.

5. The method of claim 3, wherein the network resource comprises a tag based data structure having embedded identifiers specifying resources located on the network, the embedded identifiers including said first link and second link.

6. The method of claim 1, further comprising:
   returning a network resource to the client;
   configuring the network resource so as to cause the client to contact at least the first and second server to measure the first and second server efficiency for providing resources of at least the first and second types to the client.

7. The method of claim 1, wherein each of said servers store efficiency ratings on a commonly accessible storage device.

8. The method of claim 1, further comprising:
   storing efficiency ratings for communication with the client on a storage device; and
   retrieving at least one of said stored efficiency ratings from said second server over a communication channel different from the network.

9. The method of claim 1, wherein said determining efficiency ratings comprises determining an end-user delay between the client requesting a first network resource from at least one of said servers, and the client's receiving said requested first network resource therefrom.

10. The method of claim 1, wherein the request from the client is generated by a browser, and wherein the efficiency ratings measure at least efficiency of delivering web page resources to the client.

11. The method of claim 1, further comprising:
   determining by a geographic resolution service the first server has a closest geographical proximity to the client than the second server;
   wherein the client is configured to initially contact the first server for the resource in accordance with its being geographically closest to the client.

12. An article, comprising a storage medium having instructions for locating an efficient server among servers mirroring a network site encoded thereon for execution by a processor, said instructions capable of directing the processor to perform:
   receiving a request for a resource from a client in communication with said servers over a network, the resource including links to a first resource of a first type and a second resource of a second type different from the first type;
   determining for a first server an efficiency rating indicating the first server is efficient at providing resources of at least the first type to the client;
   determining for a second server an efficiency rating indicating the second server is efficient at providing resources of at least the second type to the client; and
   directing the client to subsequently communicate with first server for accessing the first resource and the second server for accessing the second resource.

13. The article of claim 12, wherein said instructions for directing the client comprise instructions to direct the processor to perform:
   returning a network resource to the client containing a first link to the first resource at the first server and a second link to the second resource at the second server.

14. The article of claim 13, wherein the network resource comprises a web page element containing at least the first and second links respectively linking to the first and second servers.

15. The article of claim 13,
wherein the network resource comprises a tag based data structure comprising embedded identifiers specifying resources located on the network,
the embedded identifiers including said first and second link.

16. The article of claim 12, said instructions including further instructions for:
returning a network resource to the client;
configuring the network resource so as to cause the client to contact at least the first and second server to measure the first and second server efficiency for providing resources of at least the first and second types to the client.

17. The article of claim 12, wherein each of said servers stores measured communication efficiency ratings on a commonly accessible networked storage device.

18. The article of claim 12, said instructions including further instructions for
storing by the first server and the second server of efficiency ratings for communication with the client on a storage device associated thereto;
wherein the first server retrieves stored efficiency ratings from said second over a communication channel different from the network.

19. The article of claim 12, wherein said instructions for measuring efficiency ratings include further instructions for:
determining an end-user delay between requesting a first network resource from said servers, and the client's receiving said requested first network resource in response thereto.

20. The article of claim 12, wherein the request from the client is generated by a browser, and wherein the efficiency ratings measure efficiency of delivering web page resources to the client.

21. The article of claim 12, said instructions including further instructions for:
providing a network site identifier to a resolution service for determining a geographically closest server of said servers mirroring the network site;
contacting said geographically closest server in accordance with its being geographically closest to the client for the resource.

22. A method, comprising:
determining a first server is geographically closer to a client than a second server;
determining a first and a second efficiency rating of communication respectively between the client and the first and the second server, said ratings including efficiency for accessing a first resource type of the servers;
determining a third and fourth efficiency rating of communication respectively between the client and the first and the second servers, said ratings including efficiency for accessing a second resource type different from the first resource type;
determining a first and a second predicted reliability rating respectively for the first and second servers;
evaluating whether the first efficiency rating exceeds the second efficiency rating but the first predicted reliability is less than the second predicted reliability, and if so, providing a web page of the first server linking to content of the second server.

23. The method of claim 22, further comprising:
determining said first efficiency rating based in part on first contacting by the client of the first server; and
determining said second efficiency rating based at least in part on second contacting by the first server of the second server.

24. The method of claim 23, further comprising:
maintaining by the second server a rating table indexed according to client network addresses:
storing in said table an entry for each site hosting a copy of the web site, each entry indicating a measured communication efficiency between the client and each corresponding hosting site; and
sending to the first server said measured communication efficiency between the second server and the client.

25. The method of claim 24, wherein measuring communication efficiency between the client and the first and second servers comprises:
first requesting first network resources from the first server, and determining a first end-user delay for the client in receiving said first network resources; and
configuring said first network resources to include web page data to cause the client to perform a second requesting of second network resources from the second server; and
determining a second end-user delay for the client in receiving said second network resources.

26. The method of claim 22, further comprising:
if the second efficiency rating exceeds the first efficiency rating, then receiving a web page from the first server with all web links directed towards the second server; and
if the first efficiency rating exceeds the second efficiency rating, then receiving the web page from the first server with all web links directed towards the first server.

27. An article, comprising a storage medium having instructions encoded thereon, said instructions, which when executed by a processor, are capable of directing the processor to:
determine a first server is geographically closer to a client than a second server;
determine a first and a second efficiency rating of communication respectively between the client and the first and the second servers, said ratings including efficiency for accessing a first resource type of the servers;
determine a third and fourth efficiency rating of communication respectively between the client and the first and the second servers said ratings including efficiency for accessing a second resource type different from the first resource type;
determine a first and a second predicted reliability rating respectively for the first and second servers;
evaluate whether the first efficiency rating exceeds the second efficiency rating but the first predicted reliability is less than the second predicted reliability, and if so, providing a web page of the first server linking to content of the second server.

28. The article of claim 27, said instructions including further instructions to:
determine said first efficiency rating based in part on first contacting by the client of the first server; and
determine said second efficiency rating based at least in on part on second contacting by the first server of the second server.

29. The article of claim 28 said instructions including further instructions to:

maintain by the second server a rating table indexed according to client network addresses;

store in said table an entry for each site hosting a copy of the web site, each entry indicating a predicted communication efficiency between the client and each corresponding hosting site; and send to the first server, responsive to said contacting by the first server, said predicted communication efficiency for the second server and the client.

30. The article of claim 29, wherein predicting communication efficiency between the client and the first and second servers comprises:

first request first network resources from the first server, and determine a first end-user delay for the client in receiving said first network resources;

configure said first network resources to include web page data to cause the client to perform a second request of second network resources from the second server; and determine a second end-user delay for the client in receiving said second network resources.

31. The article of claim 27, said instructions including further instructions to:

determine if the second efficiency rating exceeds the first efficiency rating, and if so, then receive a web page from the first server with all web links directed towards the second server; and determine if the first efficiency rating exceeds the second efficiency rating, and if so, then receive the web page from the first server with all web links directed towards the first server.

* * * * *